Patented Feb. 7, 1933

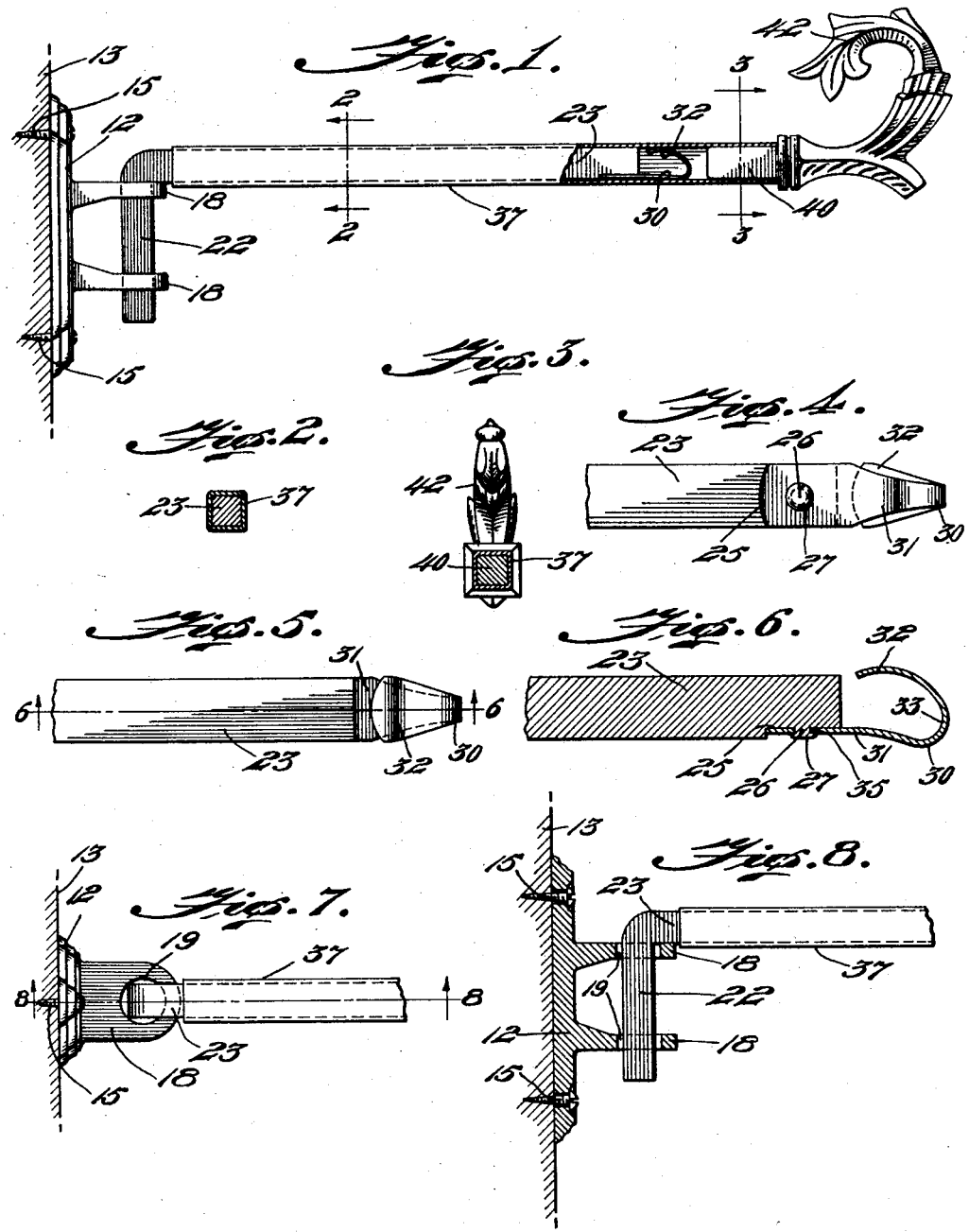

1,896,746

UNITED STATES PATENT OFFICE

JAMES N. HENRY, OF PROVIDENCE, RHODE ISLAND

CURTAIN SUPPORT

Application filed July 21, 1932. Serial No. 623,744.

My invention relates to extension curtain supports of the crane type.

The essential objects of my invention are to facilitate the extension of the support; to prevent accidental movement of the sleeve upon the arm; to enable adjustment of the parts with a minimum of effort; to afford a strong interengagement of the fixed parts, and to attain these objects in a simple and inexpensive structure.

To the above ends my invention consists in such parts and in such combinations of parts as fall within the scope of the appended claim.

In the accompanying drawing which forms a part of this invention,

Figure 1 is a side elevation of my support fixed to the frame of a window or door, showing a part broken away, Figures 2 and 3, sections of the same taken on lines 2—2 and 3—3 respectively of Figure 1, Figures 4 and 5, a bottom plan view and a top plan view respectively of the end portion of the rod arm, Figure 6, a section of the same on line 6—6 of Figure 5, Figure 7, a plan view of the bracket and the adjacent portions of my device, and Figure 8, a partial section of the same on line 8—8 of Figure 7.

Similar letters of reference indicate similar parts throughout the views.

My device includes a bracket 12 comprising an attaching plate 12 adapted to be mounted upon the casing 13 of a window or door by attaching screws 15 in its upper and lower portions. Interspaced flat lugs 18, integral with the face of the attaching plate are disposed one above the other, and each is provided with a circular opening 19 disposed in vertical alignment with the other.

A solid rod of steel or like material, rectangular in cross section, is bent to form a short vertical pivot shaft 22 and a horizontal arm 23 integral with the upper end of the shaft. The lower face of the arm at its outer end is by burring cut away to form a plane recess 25 leaving centrally thereof a post or pin 26 whose end is ultimately upset to form a rivet head 27 for a purpose now to be disclosed.

A hook 30 composed of a bent up strip of flat resilient material comprises a forwardly directed shank 31 and a rearwardly directed resilient beak 32. The looped portion 33 of the beak is somewhat narrower than the other portions of the hook. The end portion of the beak when free is in a plane slightly above the plane of the upper face of the arm 23 as shown in Figure 6. The shank 31 is centrally provided with a hole 35 to receive the post 26 whose upper end 27 is riveted over upon the back of the shank.

A transversely rectangular sleeve 37 of thin steel or other suitable metal is slidably mounted upon the arm and is of greater length than the latter. A closure member for the free end of the sleeve consists of a transversely rectangular shank portion 40 frictionally fixed in the end of the latter, and a forwardly, upwardly, and rearwardly directed ornamental portion 42 upon the end of the shank portion.

With the parts assembled as described it will be noted by reference to Figure 1 that the beak 32 of the terminal hook is compressed by the sleeve 19 to the plane of the top face of the arm 23. To change the length of my device in either direction the sleeve 37 is manually slid the desired distance upon the arm 23. The energy of the operator overcomes the degree of friction between the hook and sleeve during such movement, but when the force exerted by the operator is discontinued the friction between these two elements is sufficiently great to maintain the sleeve in its adjusted position upon the arm.

As the closure member is usually of elaborate or foliated design it is usually for economic reasons cast. Its weight, therefore, tends to tilt the portion 42 from its vertical position, and this tendency is resisted by the transversely angular shape of its shank 40 and of the corresponding transversely annular form of the enclosing sleeve 37. Were the latter two elements transversely curved the expense and disfigurement of brazing would be involved, or the employment of an equally unsightly attaching pin would be required.

Because of the rectangular transverse contour of the sleeve 37 it is possible to employ a hook composed of flat material so that the intercontacting areas of the sleeve and beak 32 is greater, and, therefore, the degree of friction greater than would be the case if the sleeve were transversely curved.

It will be observed that the integral character of the post 26, its riveted engagement with the hook, and the seat formed by the recess 25 combine to overcome the strain on the hook.

I claim:—

In a telescoping curtain rod having an outer member, an inner shaft member having one end recessed to provide a flat bearing surface with an integral stud projecting therefrom and a lock shoulder, a friction spring having a flat base abutting said lock shoulder and an opening for receiving said stud, said stud being riveted over said spring, and said spring have a reverse bend of greater width than the inner diameter of the outer telescoping member.

In testimony whereof I have affixed my signature.

JAMES N. HENRY.